United States Patent
Biskeborn et al.

(10) Patent No.: US 7,394,618 B2
(45) Date of Patent: Jul. 1, 2008

(54) SYSTEM AND METHOD FOR CLEANING A TAPE DRIVE

(75) Inventors: Robert G. Biskeborn, Hollister, CA (US); Ernest S. Gale, Tucson, AZ (US); James M. Karp, Tucson, AZ (US); Lee C. Randall, Tucson, AZ (US); Daniel J. Winarski, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 799 days.

(21) Appl. No.: 10/937,965

(22) Filed: Sep. 10, 2004

(65) Prior Publication Data
US 2006/0072234 A1  Apr. 6, 2006

(51) Int. Cl.
*G11B 5/41* (2006.01)
(52) U.S. Cl. ...................................................... 360/101
(58) Field of Classification Search .................. 360/101, 360/53, 69; 324/210
See application file for complete search history.

(56) References Cited

U.S. PATENT DOCUMENTS

| 4,525,424 A | 6/1985 | Bradshaw |
| 4,893,209 A | 1/1990 | Siddiq |
| 4,928,189 A | 5/1990 | Siddiq |
| 5,534,345 A | 7/1996 | Bradshaw |
| 5,689,384 A | 11/1997 | Albrecht et al. |
| 5,694,263 A * | 12/1997 | Miyahara et al. ............... 360/69 |
| 5,841,613 A | 11/1998 | DeMaster et al. |
| 5,905,613 A | 5/1999 | Biskeborn et al. |
| 5,930,065 A | 7/1999 | Albrecht et al. |
| 6,256,166 B1 | 7/2001 | DeMaster et al. |
| 6,304,416 B1 | 10/2001 | McAllister et al. |
| 6,320,719 B1 | 11/2001 | Albrecht et al. |
| 6,411,083 B1 * | 6/2002 | Inaba .......................... 324/210 |
| 6,687,071 B2 * | 2/2004 | Nagai et al. ................... 360/53 |
| 7,016,136 B2 * | 3/2006 | Shiratori et al. ............... 360/69 |

FOREIGN PATENT DOCUMENTS

| GB | 2335301 A * | 9/1999 |
| JP | 56161260 | 10/1981 |
| JP | 58117385 | 6/1983 |
| JP | 58140849 | 8/1983 |
| JP | 10162330 A * | 6/1998 |

\* cited by examiner

*Primary Examiner*—Tianjie Chen
(74) *Attorney, Agent, or Firm*—Quarles & Brady LLP

(57) ABSTRACT

A system, a method, and article of manufacture are employed to clean the input/output transducers on tape drives, verified by the tape drives reading alphanumeric information from data tracks and servo tracks of a cleaner tape. An aggressive cleaning frontcoat section of the cleaner tape can be used to provide additional cleaning action, and the cleanliness of the data read elements, data write elements, and the servo heads. A less-abrasive cleaning section may be used to clean less difficult types of contaminants. In this manner, the cleanliness of the data read elements, the data write elements, and the servo heads can be verified. A cleaning section may also be used as a leader section of a self-characterization section. Alternatively, a magnetic data tape section may be included for self-characterization.

28 Claims, 10 Drawing Sheets

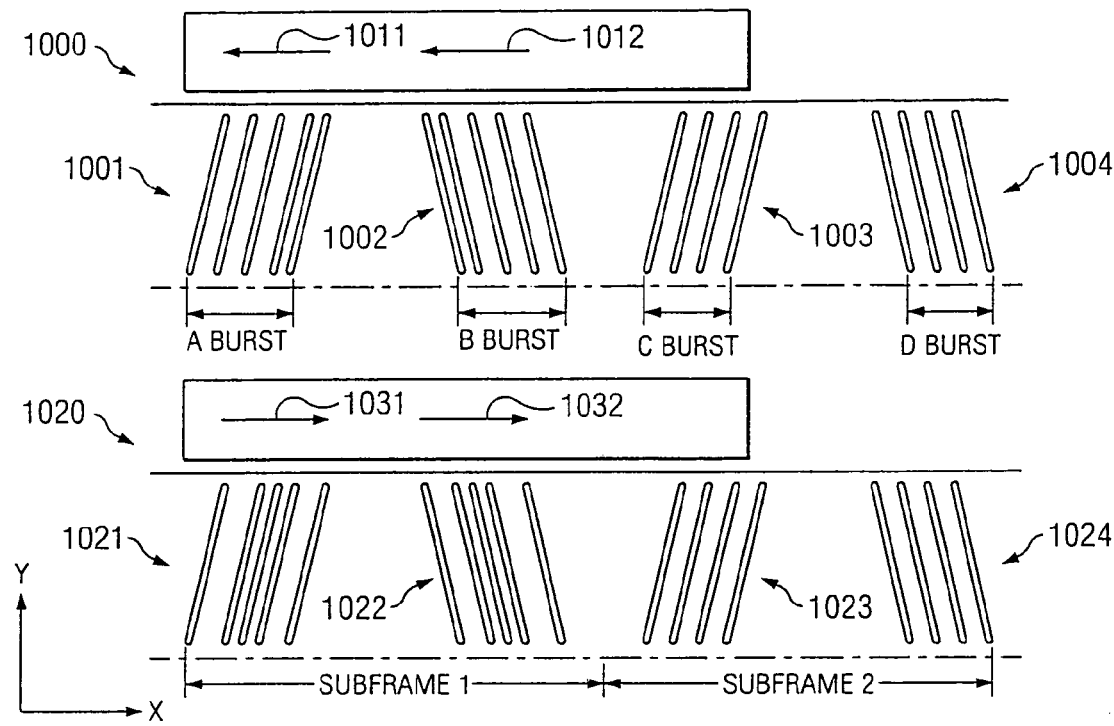
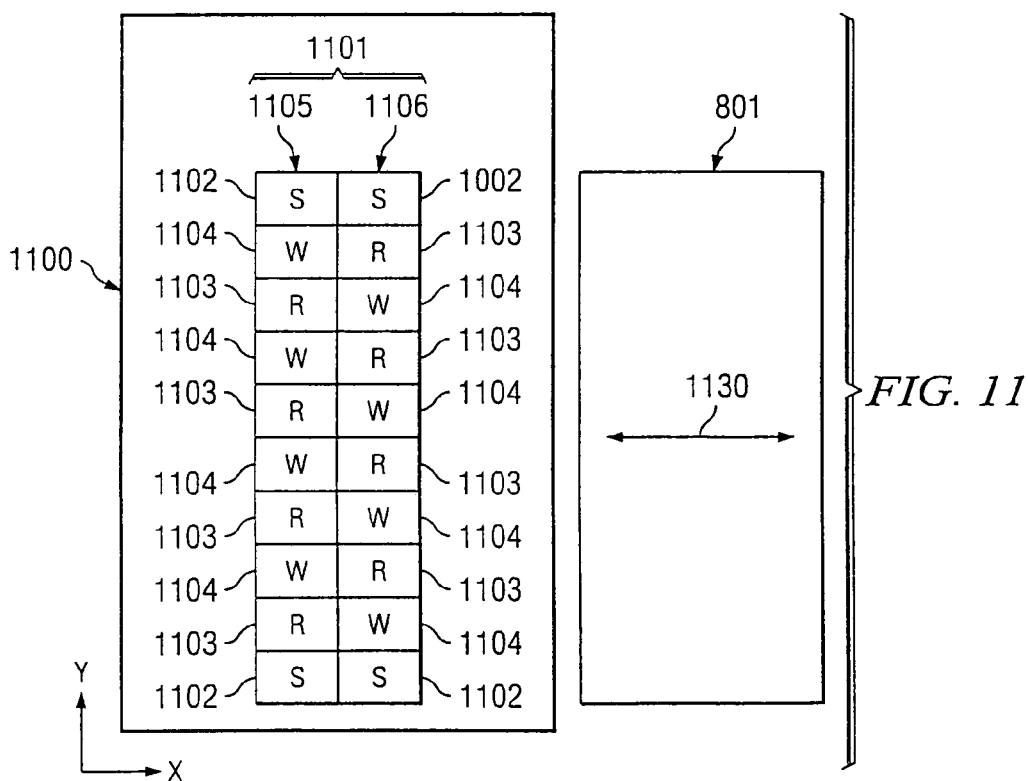

SYSTEM AND METHOD FOR CLEANING A TAPE DRIVE

BACKGROUND OF THE INVENTION

1. Field of the Invention

The invention is related in general to cleaning tape drives. More particularly, the invention consists of a novel system and method for determining when an input/output transducer of a tape drive is clean.

2. Description of the Prior Art

Storage automation products, such as the IBM 3584 Ultra Scalable Tape Library, provided by International Business Machines ("IBM")®, include tape drives, one or more robotic accessors, and a plurality of storage cells for tape cartridges. The tape drives traditionally have input/output ("I/O") transducers known as a tape head or an I/O head. During use, the I/O transducer inside of each tape drive can become contaminated with debris. This requires that the I/O transducer be cleaned with a cleaner tape.

In U.S. Pat. No. 4,893,209, Mohammed Siddiq describes a multifunctional cleaning tape used as part of a video cassette for cleaning the magnetic head of a video cassette recorder ("VCR") and providing diagnostic/instructional information to a user. The tape includes a first, non-magnetic cleaning segment for cleaning the magnetic head followed by a magnetic diagnostic segment containing prerecorded diagnostic information. The diagnostic information includes information relating to the cleanliness of the magnetic head and for adjusting the VCR for improved visual and audio output and tape tracking. However, Siddiq does not disclose reading servo information as a means of testing the cleanliness of the tape servo head.

In U.S. Pat. No. 5,841,613, Robert DeMaster et al. disclose a cassette having a leader and recordable tape which cleans the various components of the tape path in VCRs by dry scrubbing. Interactive diagnostic and instructional material is recorded on the tape to instruct the operator about the cleaning operation to enable the operator to evaluate progress of the head cleaning operation. However, DeMaster also does not disclose reading servo information as a means of testing the cleanliness of the tape servo head. While the prior art teaches testing for clean data-head elements, none of the prior art teaches testing for clean servo-head elements. Accordingly, it would be advantageous to have a system for cleaning and verifying the servo-head elements are clean utilizing a single tape cartridge.

The type of cleaning media and cleaning motion used to clean a drive head varies with the type of contaminant deposited on the drive head. Additionally, the time allowed to clean a drive head may be limited by host and system timeout conditions. Yet another consideration for cleaner cartridges is that a segment of relatively high-strength leader tape is necessary to allow threading of the tape into the cleaner cartridge during removal and replacement ("R&R") procedures. If this leader tape is made from highly abrasive material, traditional algorithms for cleaning drive-heads may inadvertently overclean and damage the drive head. These same cleaning algorithms could produce overcleaning and damage to the drive head utilizing other portions of the cleaning tape, if the entire cleaner tape was made using a highly abrasive material. However, if the abrasiveness of the entire cleaner tape is reduced, the effectiveness of the cleaner tape would likewise be reduced and the time to clean difficult contaminants may be insufficient. Therefore, it would be advantageous to utilize a cleaner tape that can remove multiple types of contaminants utilizing multiple types of cleaner without overcleaning and damaging the drive and or requiring an extended period of time to complete.

SUMMARY OF THE INVENTION

The present invention is a system and a method for cleaning the I/O transducer of a tape drive and determining when the I/O transducer is actually clean. This determination is accomplished by the tape drive reading alphanumeric information from data tracks and servo tracks of a cleaner tape. This process includes writing data to the cleaner tape, backhitching, and reading this same data. In this manner, the cleanliness of the data read elements, the data write elements, and the servo read elements can be verified.

The present invention is exemplified utilizing the cleaner cartridge, as taught by U.S. Pat. No. 6,320,719, herein incorporated by reference. A timing based servo permits small variations within components of the servo pattern, which allows the encoding of alphanumeric information within the timing based servo pattern itself. This encoding of alphanumeric information, which is called linear position information ("LPOS"), within the timing based servo is taught by U.S. Pat. No. 5,930,065, also incorporated by reference. The I/O transducer is typically a flat head as taught by U.S. Pat. No. 5,905,613, further incorporated by reference.

The I/O transducer is on an actuator which allows the I/O transducer to be actively positioned across the width of the tape via the timing based servo actively read by the servo-read elements in the I/O transducer, as taught by U.S. Pat. No. 5,689,384, which is assigned to IBM and which is incorporated by reference.

The data cartridge and the cleaner cartridge can have a cartridge memory, which allows the storage and retrieval of information from the data and cleaner cartridge without the use of the tape inside of the cartridge. Such a cartridge memory is taught by U.S. Pat. No. 6,304,416, which is incorporated by reference.

Additionally, the cleaner cartridge may include multiple types of cleaning media, such as an aggressive cleaning frontcoat segment and an alternative frontcoat segment utilizing standard data tape or a reduced-abrasion material. Segments may optionally be magnetic for future use as a self-characterization region. If none of the cleaning segments are magnetic, a magnetic data section may be added for this purpose. Optionally, whichever segment is at the end which will be loaded into a drive head may be strengthened to serve as a leader tape.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

BRIEF DESCRIPTION OF THE DRAWINGS

FIG. 10 is an illustration of encoding of alphanumeric information (LPOS) within the timing-based servo information.

FIG. 10 is a block diagram illustrating an input/output transducer with data-read elements, data-write elements, and servo heads.

DETAILED DESCRIPTION OF THE PREFERRED EMBODIMENTS

This invention is based on the idea of cleaning the input/output ("I/O") transducer of a tape drive and determining that the I/O transducer is actually clean. This determination is accomplished by the tape drive reading alphanumeric information from data tracks and servo tracks of a cleaner tape. This process includes writing data to the cleaner tape and reading this same data.

The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
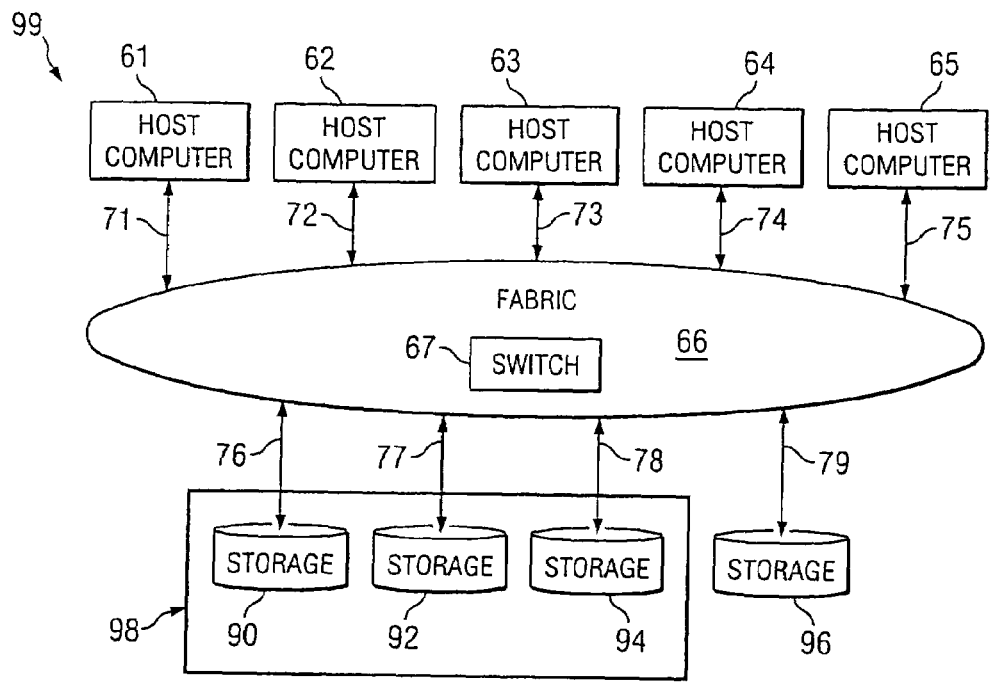
FIG. 1 is a block diagram illustrating aspects of an exemplary storage area network ("SAN").

Referring to figures, wherein like parts are designated with the same reference numerals and symbols, FIG. 1 is a block diagram that illustrates aspects of an exemplary storage area network ("SAN") 99, according to one embodiment of the present invention. The SAN 99 is designed as a switched-access-network, wherein switches 67 are used to create a switching fabric 66. In this embodiment of the invention, the SAN 99 is implemented using Small Computer Systems Interface (SCSI) protocol running over a Fibre Channel ("FC") physical layer. However, the SAN 99 could be implemented utilizing other protocols, such as Infiniband, FICON, TCP/IP, Ethernet, Gigabit Ethernet, or iSCSI. The switches 67 have the addresses of both the hosts 61,62,63,64,65 and storage units 90,92,94,96.

Host computers 61,62,63,64,65 are connected to the fabric 66 utilizing I/O interfaces 71,72,73,74,75 respectively to fabric 66. I/O interfaces 71-75 may be any type of I/O interface; for example, a FC loop, a direct attachment to fabric 66 or one or more signal lines used by host computers 71-75 to transfer information respectfully to and from fabric 66. Fabric 66 includes, for example, one or more FC switches 67 used to connect two or more computer networks. In one embodiment, FC switch 67 is a conventional router switch.

Switch 67 interconnects host computers 61-65 to storage 90, 92, 94, and 96 across respective I/O interfaces 76-79. I/O interfaces 76-79 may be any type of I/O interface, for example, a Fibre Channel, Infiniband, Gigabit Ethernet, Ethernet, TCP/IP, iSCSI, SCSI I/O interface or one or more signal lines used by FC switch 67 to transfer information respectfully to and from storage 90, 92, 94, and 96. In the example shown in FIG. 1, storage 90, 92, and 94 are stored within automated storage library 98, and storage 96 is network attached storage ("NAS").

Figure 2:
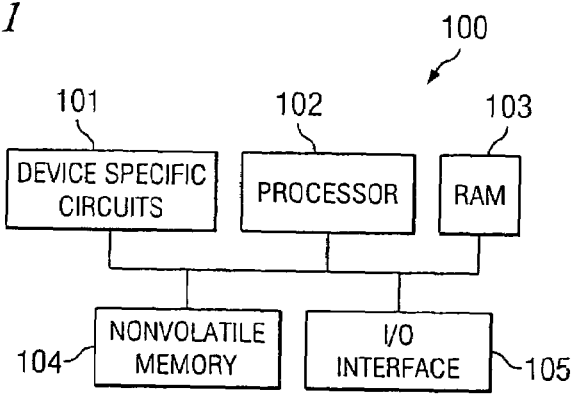
FIG. 2 is a block diagram of a library controller implementing the method of the present invention.
Figure 14:
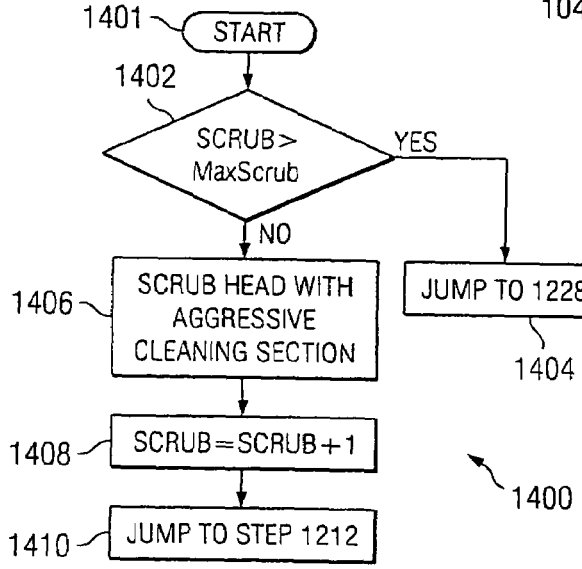
FIG. 14 is a flowchart illustrating the utilization of an aggressive cleaning section.

An automated data storage library typically comprises one or more controllers to direct the operation of the library. The controller may take many different forms and may include an embedded system, a distributed control system, a personal computer, workstation, etc. FIG. 2 shows a typical library controller 100 with a processor 102, random access memory ("RAM") 103, nonvolatile memory 104, device specific circuits 101, and an I/O interface 105.

Alternatively, the RAM 103 and/or nonvolatile memory 104 may be contained in the processor 102 as well as the device specific circuits 101 and I/O interface 105. Processor 102 may include an off-the-shelf microprocessor, custom processor, FPGA, ASIC, or other form of discrete logic. RAM 103 is typically used to hold variable data, stack data, executable instructions, etc. The nonvolatile memory 104 may comprise any type of nonvolatile memory such as Electrically Erasable Programmable Read Only Memory ("EEPROM"), flash Programmable Read Only Memory ("PROM"), battery backup RAM, hard disk drive, or other similar device.

The nonvolatile memory 104 is typically used to hold the executable firmware and any nonvolatile data. I/O interface 105 comprises a communication interface that allows processor 102 to communicate with devices external to the controller. Examples of I/O interface 105 include serial interfaces such as RS-232 or USB (Universal Serial Bus), SCSI (Small Computer Systems Interface), Fibre Channel, etc. In addition, I/O interface 105 may comprise a wireless interface such as radio frequency ("RF") or Infrared. The device specific circuits 101 provide additional hardware to enable the controller 100 to perform unique functions such as motor control of a cartridge gripper, etc.

Device specific circuits 101 may comprise electronics that provide Pulse Width Modulation (PWM) control, Analog to Digital Conversion (ADC), Digital to Analog Conversion (DAC), etc. In addition, all or part of the device specific circuits 101 may reside outside controller 100.

Figure 3:
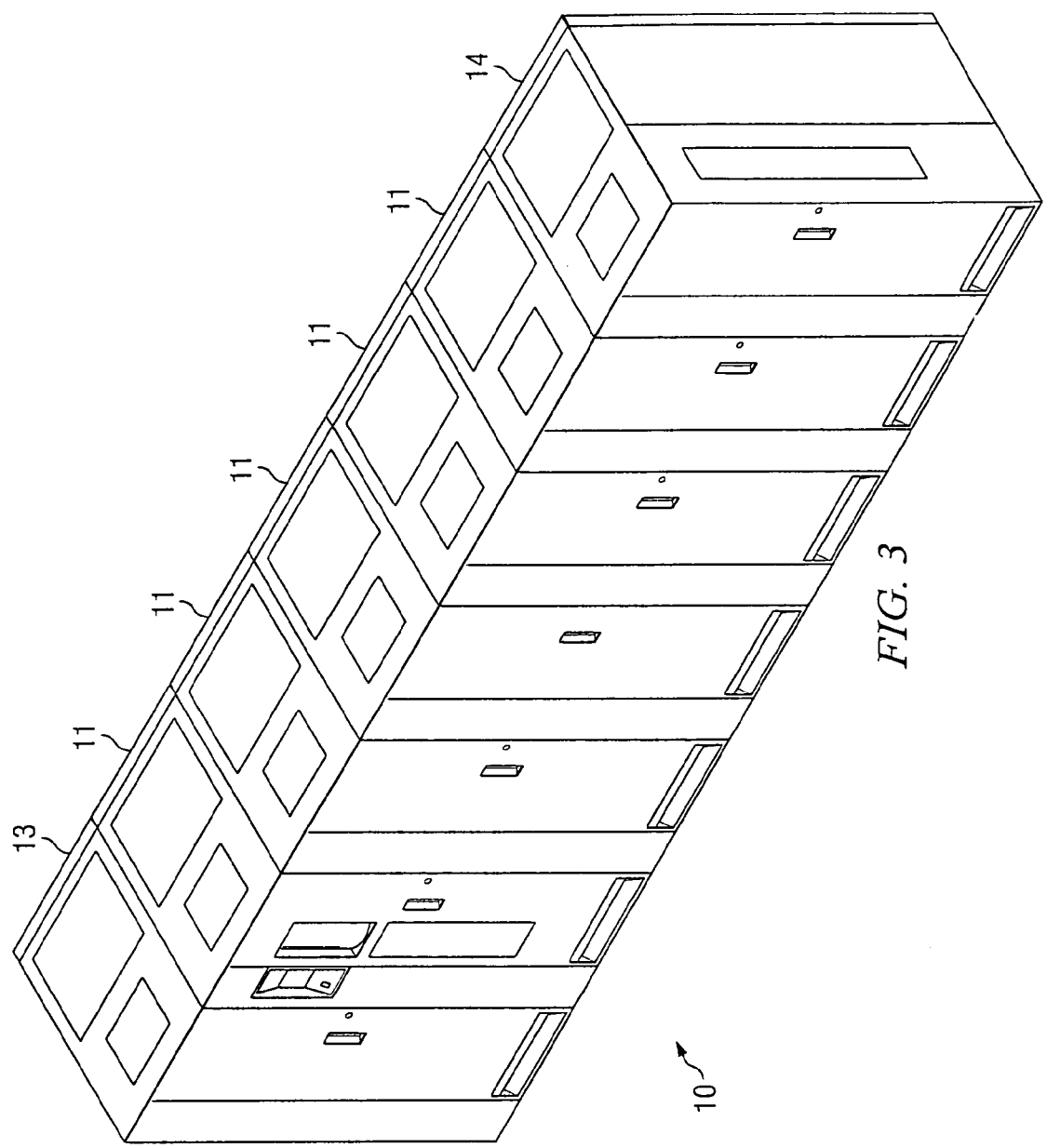
FIG. 3 is an illustration of an automated data storage library including a left hand service bay, multiple storage frames, and a right hand service bay.

FIG. 3 illustrates an automated data storage library 10 with left hand service bay 13, one or more storage frames 11, and right hand service bay 14. A frame may include an expansion component to the library. Frames may be added or removed to expand or reduce the size and/or functionality of the library. Frames may also include storage shelves, drives, import/export stations, accessors, operator panels, etc.

Figure 4:
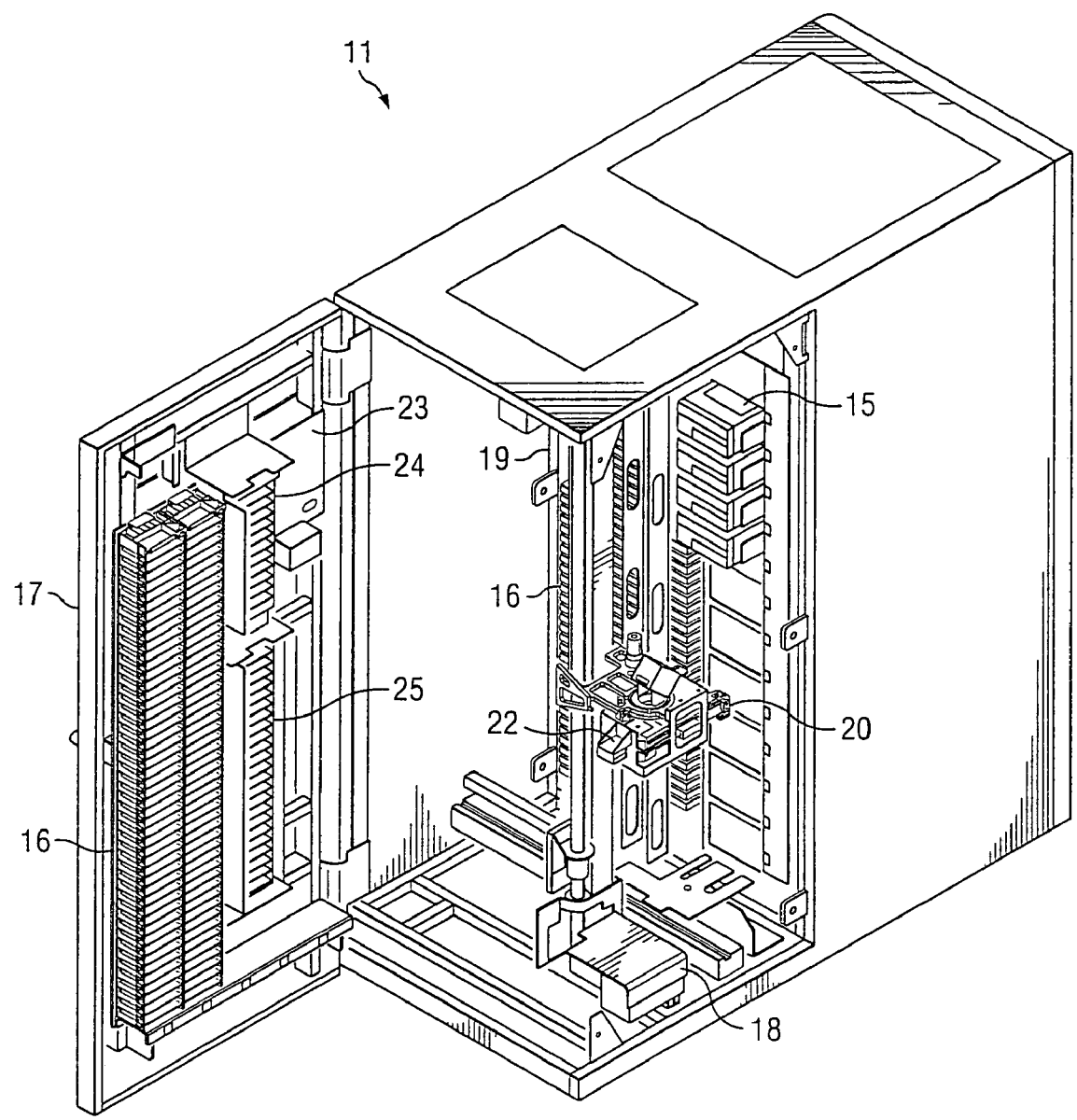
FIG. 4 is an illustration of internal components of the automated data storage library of FIG. 3.

FIG. 4 shows an example of a storage frame 11, which also is the minimum configuration of the library 10 in FIG. 3. In this minimum configuration, there is no redundant accessor or service bay. The library is arranged for accessing data storage media (not shown) in response to commands from at least one external host system (not shown), and comprises a plurality of storage shelves 16, on front wall 17 and rear wall 19, for storing data storage cartridges that contain data storage media; at least one data storage drive 15 for reading and/or writing data with respect to the data storage media; and a first accessor 18 for transporting the data storage media between the plurality of storage shelves 16 and the data storage drives 15. The storage frame 11 may optionally comprise an operator panel 23 or other user interface, such as a web-based interface, which allows a user to interact with the library. The storage frame 11 may optionally include an upper I/O station 24 or a lower I/O station 25, which allows data storage media to be inserted into the library and/or removed from the library without disrupting library operation. The library 10 may include one or more storage frames 11, each having storage shelves 16 accessible by first accessor 18. As described above, the storage frames 11 may be configured with different components depending upon the intended function. One configuration of storage frame 11 may comprise storage shelves 16, data storage drives 15, and other optional components to store and retrieve data from the data storage cartridges. The first accessor 18 includes a gripper assembly 20 for gripping one or more data storage media and may also include a bar code scanner 22 or reading system, such as a smart card reader or similar system, mounted on the gripper 20, to read or write identifying information about the data storage media to a cartridge memory.

Figure 5:
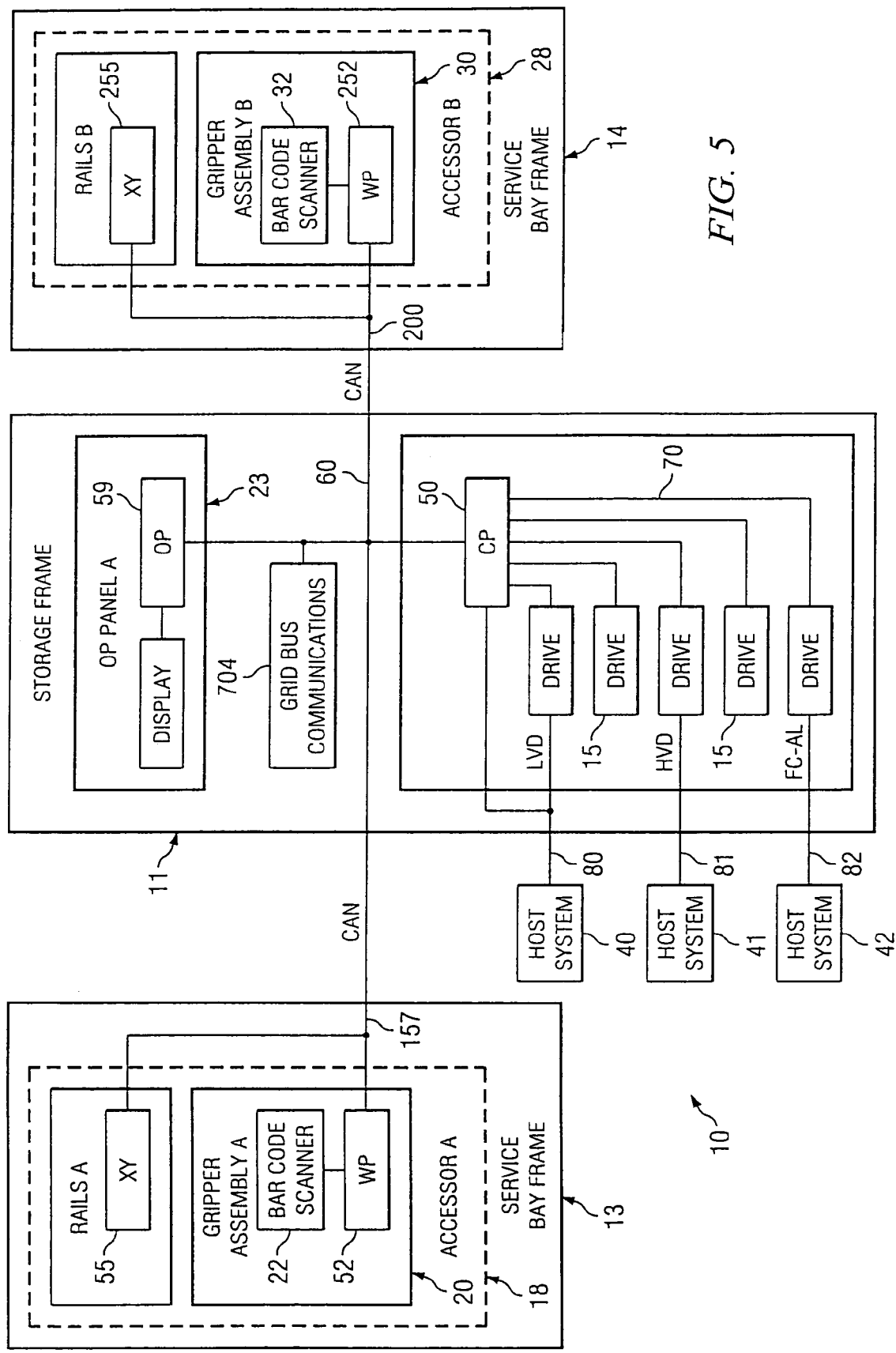
FIG. 5 is a block diagram illustrating an embodiment of an automated data storage library which includes a distributed system of processor nodes.

FIG. 5 illustrates internal components of the automated data storage library 10 of FIGS. 3 and 4, employing a distributed system of modules with a plurality of processor nodes. An example of an automated data storage library which may implement the present invention is the IBM 3584 UltraScalable Tape Library®. While the library 10 has been described as a distributed control system, this invention applies equally to libraries that incorporate other control configurations such as one or more library controllers that are not distributed. The library of FIG. 5 includes one or more storage frames 11, a left hand service bay 13 and a right hand service bay 14.

The left hand service bay 13 is shown with a first accessor 18. As discussed above, the first accessor 18 includes a gripper assembly 20 and may include a reading system 22 to read or write identifying information about the data storage media to a cartridge memory. The right hand service bay 14 is shown with a second accessor 28. The second accessor 28 includes a gripper assembly 30 and may include a reading system 32 to read or write identifying information about the data storage media, for example, to a cartridge memory. In the event of a failure or other unavailability of the first accessor 18, or its gripper 20, etc., the second accessor 28 may perform all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14. In addition, the present invention may operate with fewer or more than two accessors.

In the exemplary library, the first accessor 18 and the second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15.

The exemplary library 10 receives commands from one or more host systems 40, 41, 42 or for example, hosts 61-65 shown in FIG. 1. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves 16 and the data storage drives 15. The commands are typically logical commands identifying the media and/or logical locations for accessing the media.

The exemplary library is controlled by a distributed control system receiving the logical commands from hosts, determining the required actions, and converting the actions to physical movements of first accessor 18 and/or second accessor 28.

In the exemplary library, the distributed control system includes a plurality of processor nodes 50, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18 and that is coupled to the communication processor node 50 via a network 60, 157. A second work processor node 252 that may be located at second accessor 28 and that is coupled to the communication processor node 50 via a network 60, 200 may also be provided. Each work processor node may respond to received commands that are broadcast to the work processor nodes from any communication processor node, and the work processor node may also direct the operation of first accessor 18, providing move commands. An XY processor node 55 may be provided and may be located at an XY system of first accessor 18. The XY processor node 55 is coupled to the network 60, 157, and is responsive to the move commands, operating the XY system to position the gripper 20. Similarly, an XY processor node 255 may be provided and may be located at an XY system of second accessor 28. The XY processor node 255 is coupled to the network 60.

Also, an operator panel processor node 59 may be provided at the optional operator panel 23 for providing an interface for communicating between the operator panel and the communication processor node 50, the work processor node 52, and the XY processor node 55.

A network, with a common bus 60, is provided, coupling the various processor nodes. The network may include a robust wiring network, such as the commercially available Controller Area Network ("CAN") bus system, which is a multi-drop network, having a standard access protocol and wiring standards, for example, as defined by the CAN in Automation Association ("CiA"). Other networks, such as Ethernet, or wireless network systems, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host systems with a library interface similar to the drive/library interface. As is known to those of skill in the art, various communication arrangements may be employed for communication with the hosts and with the data storage drives. In the example of FIG. 5, host connections 80 and 81 are SCSI busses. Bus 82 comprises an example of a Fibre Channel-Arbitrated Loop which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Also in FIG. 5, a grid bus communications 704 is connected to the communication processor node 50 via a network 60. Through communication processor node 50, hosts 40-42 can communicate with grid bus communications 704. Referring to both FIG. 5 and FIG. 7, hosts 40-42 and/or communication processor node 50 can wirelessly query the cartridge memory 703 of removable storage media 700 in storage slots 16. These queries may involve auditing the storage media in the storage slots, to insure that the map of the locations of the storage media in the storage slots is correct. This map of the locations of the storage media is important so that accessors 18 and 28 can go directly to the desired storage slot. This query may also include auditing the status of cleaner cartridges in storage slots 16.

Additional storage frames 11 may be provided and each is coupled to the adjacent storage frame. Any of the storage frames 11 may comprise communication processor nodes 50, storage shelves 16, data storage drives 15, and networks 60.

In FIG. 5 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 6A:
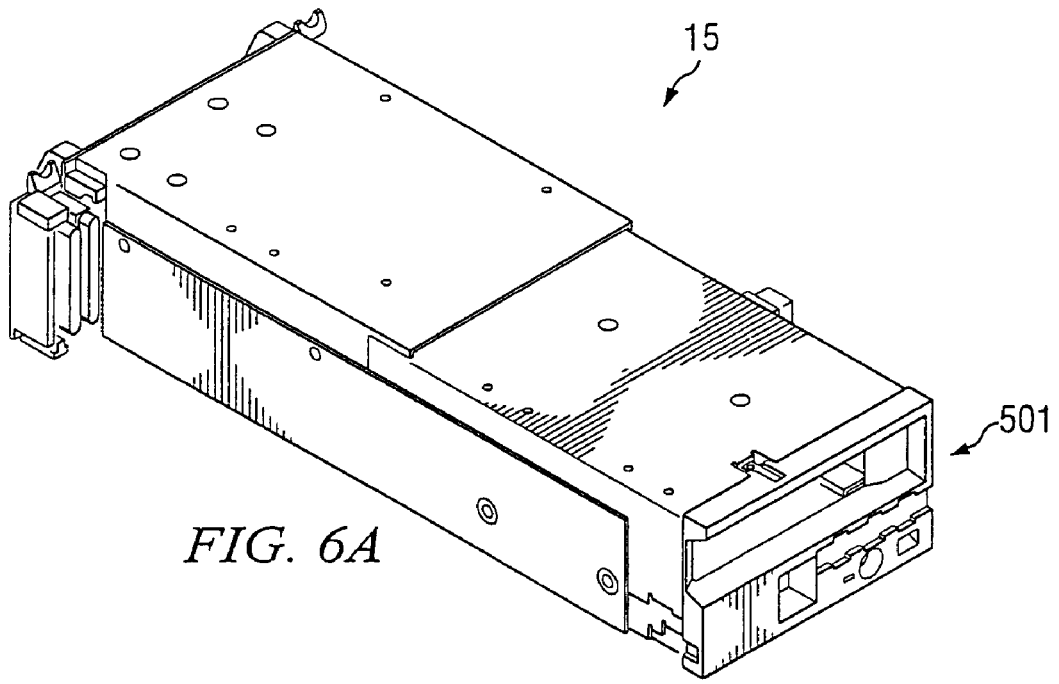
FIG. 6 is an illustration of a front and rear view of a data storage drive mounted in a drive canister.
Figure 6B:
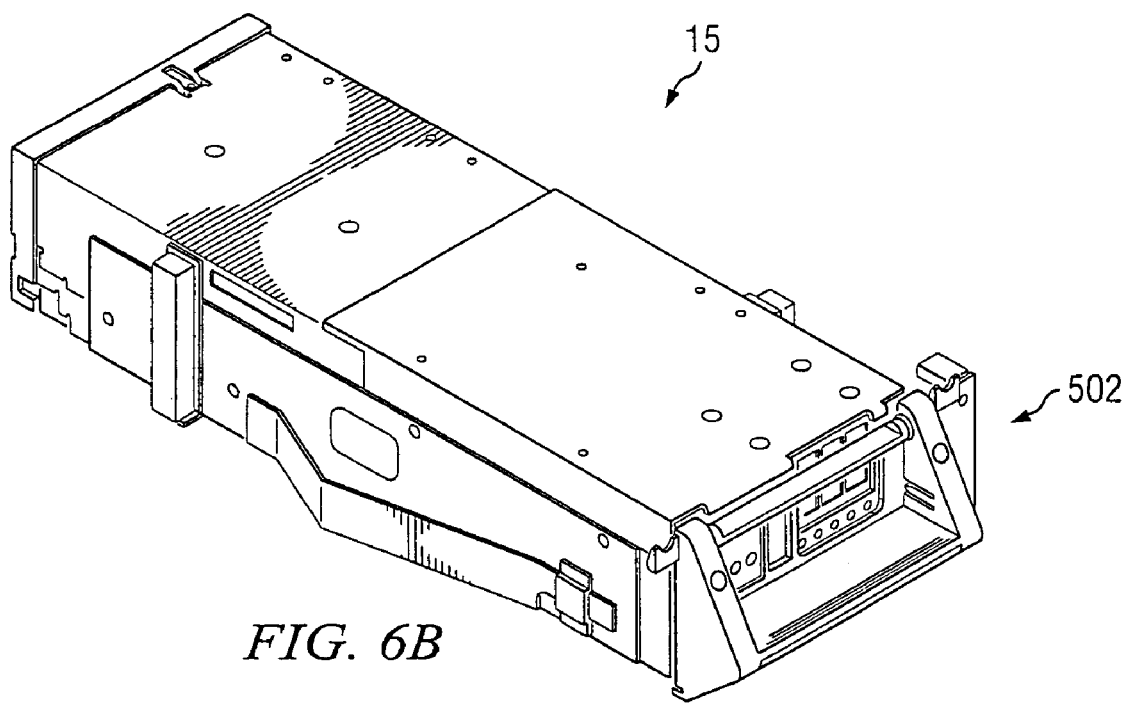

FIG. 6 shows a view of the front 501 and rear 502 of drive 15. In this example, drive 15 is a removable media LTO (Linear Tape Open) tape drive mounted in a drive canister. The drive canister may comprise a housing to hold drive 15, mounting means to attach drive 15 to the drive canister, electrical components, interface cables, interface connectors, etc. The data storage drive of this invention may comprise any removable media drive such as magnetic or optical tape drives, magnetic or optical disk drives, electronic media drives, or any other removable media drive as is known in the art.

Figure 7:
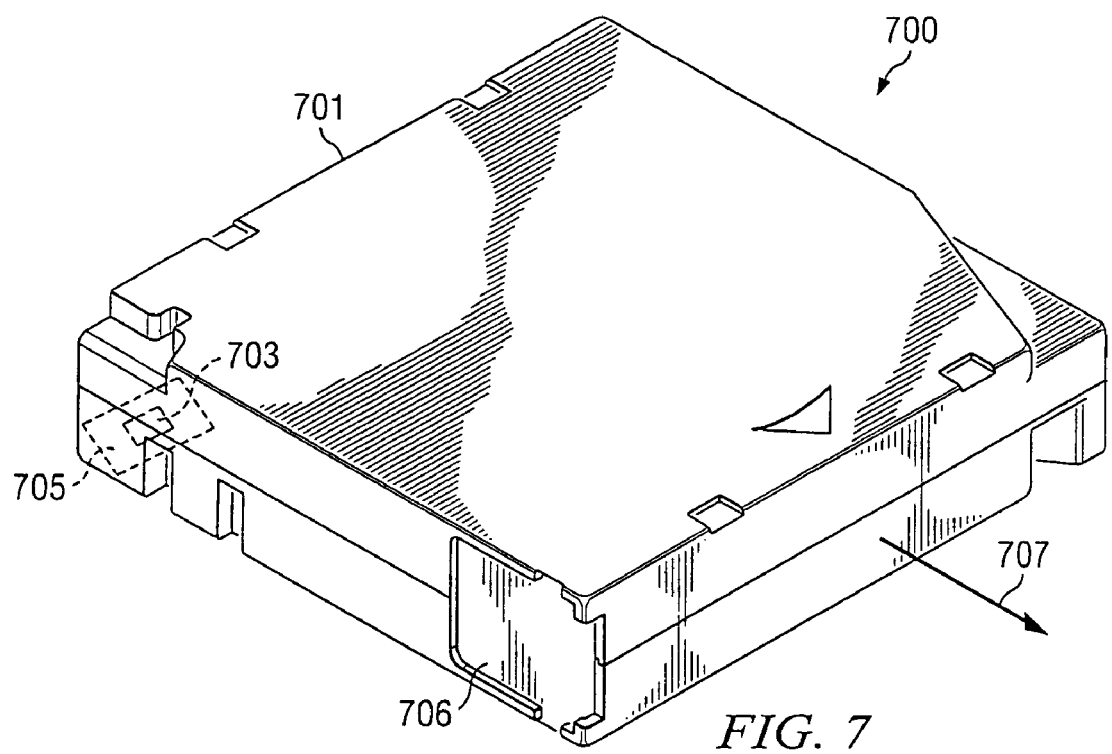
FIG. 7 is an illustration of a tape cartridge with cartridge memory.

FIG. 7 shows exemplary tape cartridge 700. Tape cartridge 700 includes exterior cartridge shell 701 and sliding door 706. Sliding door 706 is slid open when tape cartridge 700 is inserted into drive 15. Sliding door 706 is normally closed when tape cartridge 700 is not in use, so that debris and contaminants do not enter tape cartridge 700 and degrade tape 801. The direction that tape cartridge 700 is slid into drive 15 is shown as direction 707. Tape cartridge 700 also contains cartridge memory 703, which is on printed circuit board 705. Cartridge memory 703 is preferably at a 45 degree angle, to allow drive 15, accessors 18 and 28, and grid bus communications 704 to wirelessly access the contents of cartridge memory 703.

Figure 8:
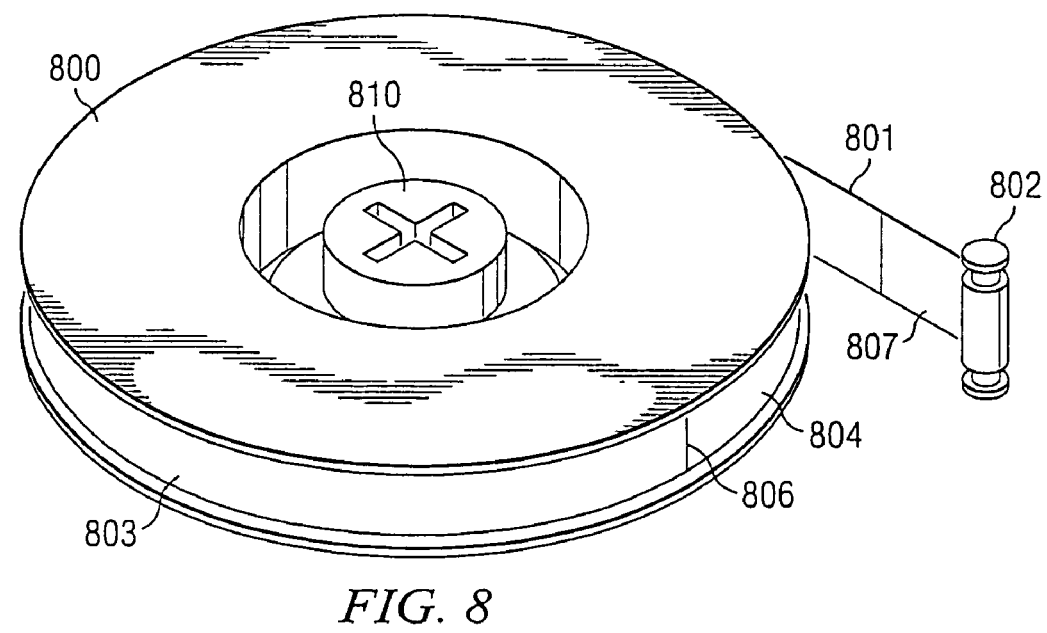
FIG. 8 illustrates a reel of tape contained in the tape cartridge of FIG. 7.

FIG. 8 shows exemplary tape reel 800, which is stored in tape cartridge 700. Tape reel 800 is prevented from rotation when tape cartridge 700 is not in drive 15 by brake button 810. Drive 15 releases brake button 810 when tape cartridge 700 is inserted into drive 15, which then allows the free rotation of tape reel 800. Tape reel 800 is wound with tape 801.

Tape 801 preferably consists of an aggressive cleaning frontcoat section 803 and an alternative frontcoat section 804 consisting of either standard data tape or tape coated with metal particles for non-aggressive cleaning. The aggressive cleaning frontcoat section 803 preferably consists of a coating of chromium dioxide ($CrO2$) particles, as chromium dioxide particles are somewhat more abrasive than metal particles. An exemplary chromium dioxide frontcoat section 803 is taught by U.S. Pat. No. 4,525,424, which is herein incorporated by reference. Alternately, frontcoat section 803 could contain alumina ($Al2O3$), chrome-3 ($Cr2O3$), or silicon dioxide ($SiO2$) particles. The alternative frontcoat section 804 may include metal particles as taught by U.S. Pat. No. 5,534,345, which is also herein incorporated by reference. Typical metal particles which could be used in the alternative frontcoat section 804 are oxide-coated iron metal or magnetic ferrites such as barium ferrite. Alternately, alternative frontcoat section 804 could alternately be magneto-optical or optical phase-change tape.

On the free end of tape 801 is leader pin 802. When tape cartridge 700 is slid into drive 15, sliding door 706 is opened, and tape drive 15 threads leader pin 802 and attached tape 801 through the tape path. Sliding door 706 is normally closed when tape cartridge 700 is not in use, so that external debris and contaminants do not enter tape cartridge 700 and degrade tape 801. Cleaner tape 801 preferably has an aggressive cleaning frontcoat section 803 made from a material such as chromium dioxide ($CrO2$) which tends to be more aggressive and thus better at cleaning stubborn debris from the magnetic transducer. Cleaner tape 801 also has an alternative frontcoat section 804, which may utilize the same formulation as actual data tapes for further cleaning of the magnetic transducer and for testing the overall cleaning process. Typically, the alternative frontcoat section 804 includes metal particles. Alternately, tape 801 may use the identical formulation of tape for both data and cleaning purposes. The contents of cartridge memory 703 are used to distinguish tape cartridge 700 as either a data cartridge or a cleaner cartridge.

Whichever segment is closest to the free end of the tape 801 may double as a leader tape, if made from a sufficiently strong material. If none of the segments are magnetic, the calibration region 807 may include magnetic data tape used for self-characterization.

Chromium dioxide cleaner section 803 and alternative frontcoat section 804 are typically spliced together at splice 806. This splice may be straight across, i.e., perpendicular to the edge of the tape, as shown in FIG. 8. Alternately, this splice may be at an angle to the edge of the tape, such as a 45 degree angle. Finally, this splice may be of a V-shape, where the apex of the V is at the centerline of the tape. By correctly controlling the amount of each type of segment, the cleaner tape may be used to optimize cleaning of exiting tape drives without changing the cleaning algorithms employed by tape drives or overcleaning and damaging input/output transducers, such as drive heads. Additionally, a single cleaning tape may be used to clean multiple types of contaminants where two or more different types of cleaning tapes would otherwise be necessary. Algorithms for cleaning input/output transducers may be optimized to work with the cleaner cartridges. For example, a streaming motion may be more effective when applying an one type of cleaning segment while a backhitch motion may be better for other types of cleaning segments.

Figure 9:
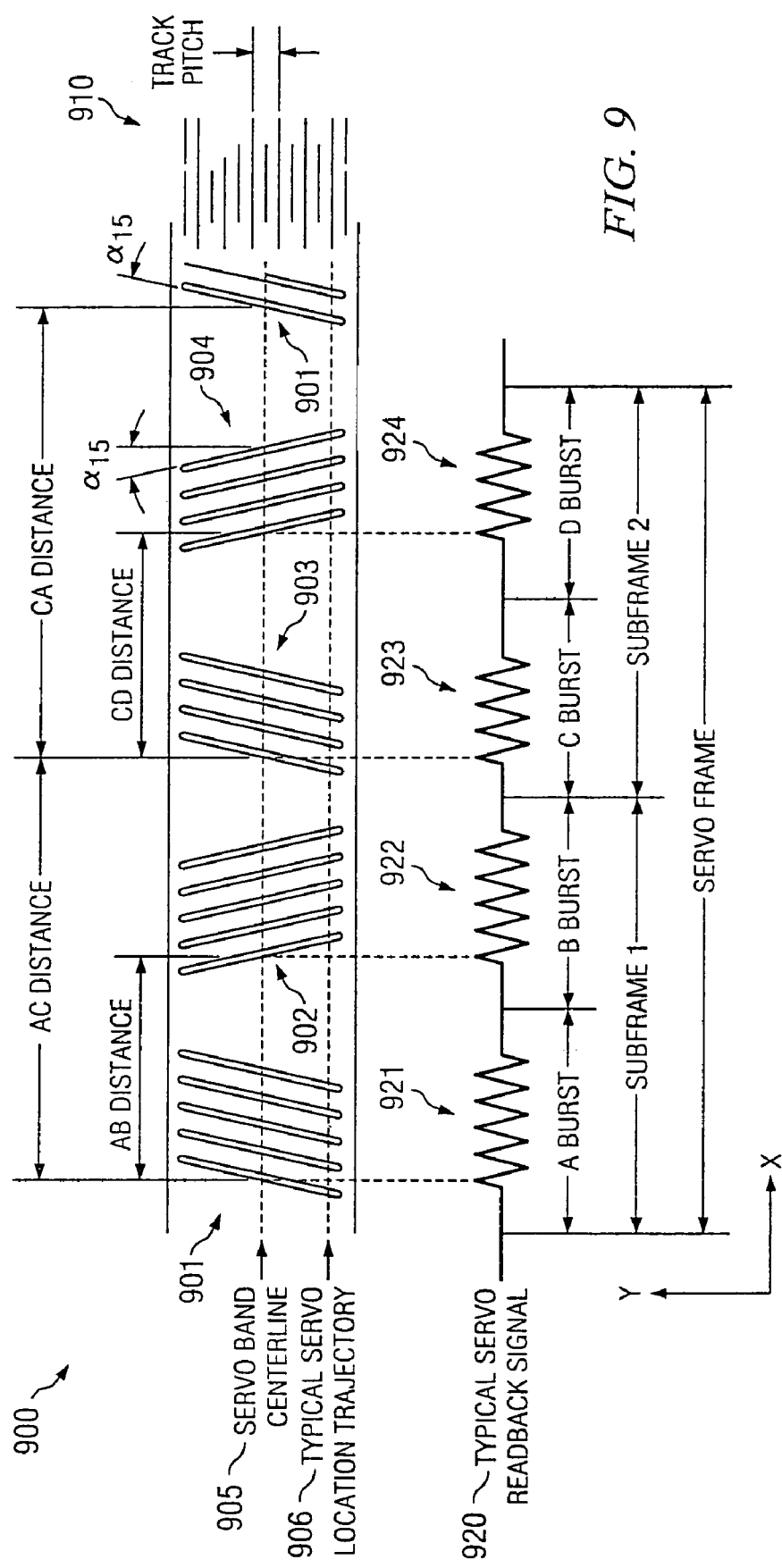
FIG. 9 is an illustration of timing-based servo information implemented by a timing based servo.

The alternative frontcoat section 804 may include timing-based servo information 900, as illustrated in FIG. 9. Timing-based servo information 900 is written to the tape during the manufacturing process by dedicated servo writers. Timing-based servo information 900 has a repeating quadruple component pattern of A-burst 901, B-burst 902, C-burst 903, and D-burst 904, each of which comprise a plurality of servo stripes which are parallel within their respective servo bursts. Additionally, A-burst 901, B-burst 902, C-burst 903, and D-burst 904 lie along common centerline 905. A-burst 901 and B-burst 902 each consist of five diagonal servo stripes, where the B-burst stripes are at the opposite angle of the A-burst stripes. Similarly, C-burst 903 and D-burst 904 each consist of four diagonal servo stripes, where the D-burst stripes are at the opposite angle of the C-burst stripes.

Alternative frontcoat section 804 has a plurality of data tracks 910. I/O transducer 1100, discussed in greater detail in FIG. 11, has servo heads 1102 which read timing-based servo information 900 along typical servo trajectory 906. This I/O transducer may be a drive-head or other similar device. Typical servo readback signal 920 generated by servo heads 1102 reading timing-based servo 900 is shown as A-readback-burst 921, B-readback-burst 922, C-readback-burst 923, and D-readback-burst 924. Typical servo readback signal 920 is used to position I/O transducer 1100 along the Y-axis in FIG. 11. The Y-axis in FIG. 11 is perpendicular to the upper and lower edges of alternative frontcoat section 804 and is perpendicular to the direction of motion of the tape, which is along the X-axis in FIG. 11.

The timing-based servo information 900 contains alphanumeric information, called linear position information ("LPOS"), as illustrated in FIG. 10. First quadruple 1000 has A-burst 1001, B-burst 1002, C-burst 1003, and D-burst 1004. Within A-burst 1001, two of the parallel servo stripes are spread apart 1011 and within B-burst 1002, two of the parallel servo stripes are spread apart 1012, which represents an encoded binary digit 1. Second quadruple 1020 has A-burst 1021, B-burst 1022, C-burst 1023, and D-burst 1024. Within A-burst 1021, two of the parallel servo stripes are shifted closer together 1031 and within B-burst 1022, two of the parallel servo stripes are shifted closer together 1032, which represents an encoded binary digit 0. First quadruple 1000 and second quadruple 1020 are written in various combinations during the manufacturing process sequentially, along the X-axis of tape 801, to encode alphanumeric characters as strings of binary digits. These alphanumeric characters are read by the servo heads 1102 shown in FIG. 11. For a cleaner tape in a cleaner cartridge, these alphanumeric characters could spell out "THIS IS A CLEANER TAPE. CAN YOU READ ME?" This servo test pattern or other suitable test pattern in the LPOS could be used to test the cleanliness of servo heads 1102 shown in FIG. 11 and step 1214 of FIG. 12.

FIG. 11 shows I/O transducer 1100, consisting of two columns of elements, 1105 and 1106. Columns 1105 and 1106 alternate the position of data-write elements 1104 and data-read elements 1103, so that read-after-write can be practiced. Read-after-write means that the newly written data is verified immediately after it is written, to improve the reliability of subsequent accesses to that data. I/O transducer 1100 also has a plurality of servo heads 1102 so that I/O transducer can be positioned either above or below timing-based servo 900 in order to access data tracks 910 on tape 801. The direction of tape motion 1130 of tape 801 is parallel to the X-axis.

Figure 12:
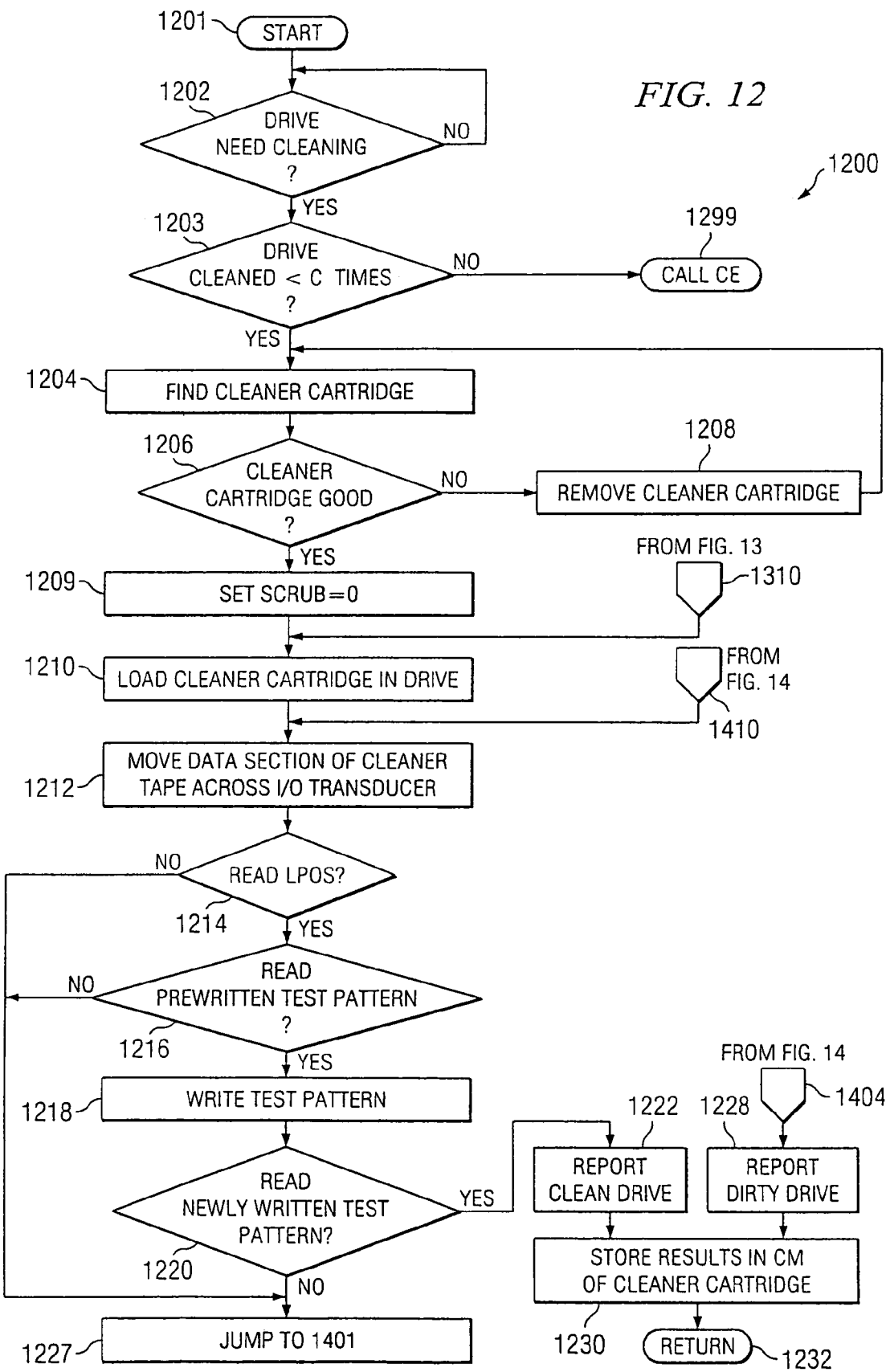
FIG. 12 is a flowchart illustrating the process of cleaning of a tape drive.

FIG. 12 shows flowchart 1200 for the use of a cleaner cartridge in a tape drive 15. The process starts at step 1201 and proceeds to decision step 1202, where a determination is made whether any tape drives need cleaning. This determination may be based on an evaluation of servo frame rate errors of the amount of error correction that must be performed by the tape drive. Alternatively, this determination may be ascertained may evaluating the amount of error recovery performed by the tape drive or monitoring read/write amplitude information. To aid in the monitoring of read/write amplitude information, a calibration region 807 (FIG. 8) may be included on the cleaner tape 801 (FIG. 8). Alternatively, this calibration region may be utilized as a magnetic self-characterization region.

Tape drives may be storage 90, 92, and 94 in library 98, or Network Attached Storage 96 as shown in FIG. 1. Alternately, these tape drives may be drives 15 in FIGS. 4, 5, and 6. If the determination is no in step 1202, the process cycles back to start step 1201, to continue to monitor the drives for future cleaning needs. If the determination is yes in step 1202, the process flows to step 1203, where the determination is made whether the drive has already been cleaned C times, where C is a number which could be set by a system administrator or the user. The reason for parameter C is that the tape drive may be unresponsive to being cleaned more than C times and it is better to immediately call for a customer engineer, which is abbreviated as "CE." If the determination in step 1203 is that the drive has not been cleaned fewer than C times, the process flows to and ends at step 1299, where a CE is called. The CE may either manually clean the drive or replace the drive entirely. The number of times a drive has been cleaned is stored either in a system controller or in a memory within the drive itself. If the number of times that a drive has been cleaned is stored within the drive itself, the memory used is preferably an EPROM (Erasable, Programmable Read-Only-Memory) or other nonvolatile storage memory.

If, the determination is yes in step 1203, because the drive in question has been cleaned less than C times, the process flows to step 1204, where a cleaner cartridge is located. Such a cleaner cartridge may be cartridge 700 shown in FIG. 7, which contains a reel 800 of cleaner tape 801. Within library module 11, this cleaner cartridge is preferably stored in storage slots 16. Once a cleaner cartridge is found, a determination is made in step 1206 as to whether the cleaner cartridge is a good cleaner cartridge. As described in flowchart 1300 of FIG. 13, if a first cleaner cartridge fails to clean a tape drive and a second cleaner cartridge succeeds to clean that tape drive, the first cleaner cartridge is marked BAD in its cartridge memory. By accessing cartridge memory 703 in cleaner cartridge 700 via grid bus communications 704, the GOOD/BAD status of cleaner cartridge 700 can be ascertained. If indeed the found cleaner cartridge is BAD, the process flows to step 1208 where the BAD cleaner cartridge is removed from further service by removing it from library module 11, and the process flows back to step 1204 where a search for another cleaner cartridge is made. If the found cleaner cartridge is indeed GOOD, the process flows to step 1209 where counter SCRUB is initialized to zero and then to step 1210 where the cleaner cartridge is loaded into a tape drive. This loading process may be manual, for Network Attached Storage 98. Either accessor 18 or 28 load cleaner cartridge 700 into drive 15, in library 10. As an alternate embodiment, the cartridge memory 703 of tape cartridge 700 may be accessed by drive 15 after cleaner cartridge 700 is loaded into drive 15. If this is the case, then steps 1206 and 1208 would follow step 1210 rather than precede it.

Once a "GOOD" cleaner cartridge is loaded into drive 15 in step 1210, the process flows to step 1212, where the cleaner tape 801 is threaded through the tape path (not shown) via the use of leader pin 802 and then the cleaner tape 801 is moved across I/O transducer 1100. After a predetermined amount of cleaner tape is moved across I/O transducer 1100, the process flows to decision step 1214, where the determination is made whether the servo heads 1102 can read the alphanumeric information which is stored in binary form in LPOS 1000 with acceptable quality. If the determination in step 1214 is "yes", the servo heads 1102 are declared clean and the process flows to decision step 1216, where the determination is made whether data-read elements 1103 can read a pre-written test pattern in data tracks 910 with acceptable quality. If the determination is yes in step 1216, data-read elements 1103 are declared clean and the process flows to step 1218 where data-write elements 1104 write a test pattern to data tracks 910, at a different location on tape 801 than the pre-written test pattern used to test data-read elements 1103. The process flows to decision step 1220, where the determination is made whether data-read elements 1103 can read the test pattern written by data-write elements 1104 with acceptable quality. If the decision is "yes" in step 1220, tape drive 15 is reported as "CLEAN" in step 1222. The process flows from step 1222 to step 1230, where the results of the cleaning are stored in cartridge memory 703 of cleaner cartridge 700, and then the process returns to the location from which it was originated in step 1232.

If the decision in steps 1214, 1216, or 1220 was no, the process flows to step 1227, where a jump is made to step 1401 of flowchart 1400. Flowchart 1400 governs the use of the aggressive cleaning section 803. The process flows from step 1401 to decision step 1402, where the determination is made whether counter SCRUB exceeds MaxScrub. If the decision is yes, that counter SCRUB exceeds MaxScrub, then the maximum number of iterations of the aggressive cleaning section have been used and the head has not yet been cleaned. The process then flows to step 1404, where a jump is made to step 1228 of flowchart 1200, where the drive is declared "dirty." From step 1228, the process flows to step to step 1230, where the results of the cleaning are stored in cartridge memory 703 of cleaner cartridge 700, and then the process returns to the location from which it was originated in step 1232. The information stored in cartridge memory 703 regarding the DIRTY tape drive includes whether the data-read elements, data-write elements, or servo heads were the elements which were unable to be cleaned satisfactorily.

If in step 1402, the decision is no, the process flows to step 1406 where the aggressive cleaning section 803 is scrubbed across the magnetic transducer. The process flows to step 1408, where SCRUB is incremented by one, to indicate the cleaning action in step 1406. Then, the process flows to step 1410, where the process jumps to step 1212 of flowchart 1200, for another round of testing of the servo heads, the read elements, and the write elements.

Figure 13:
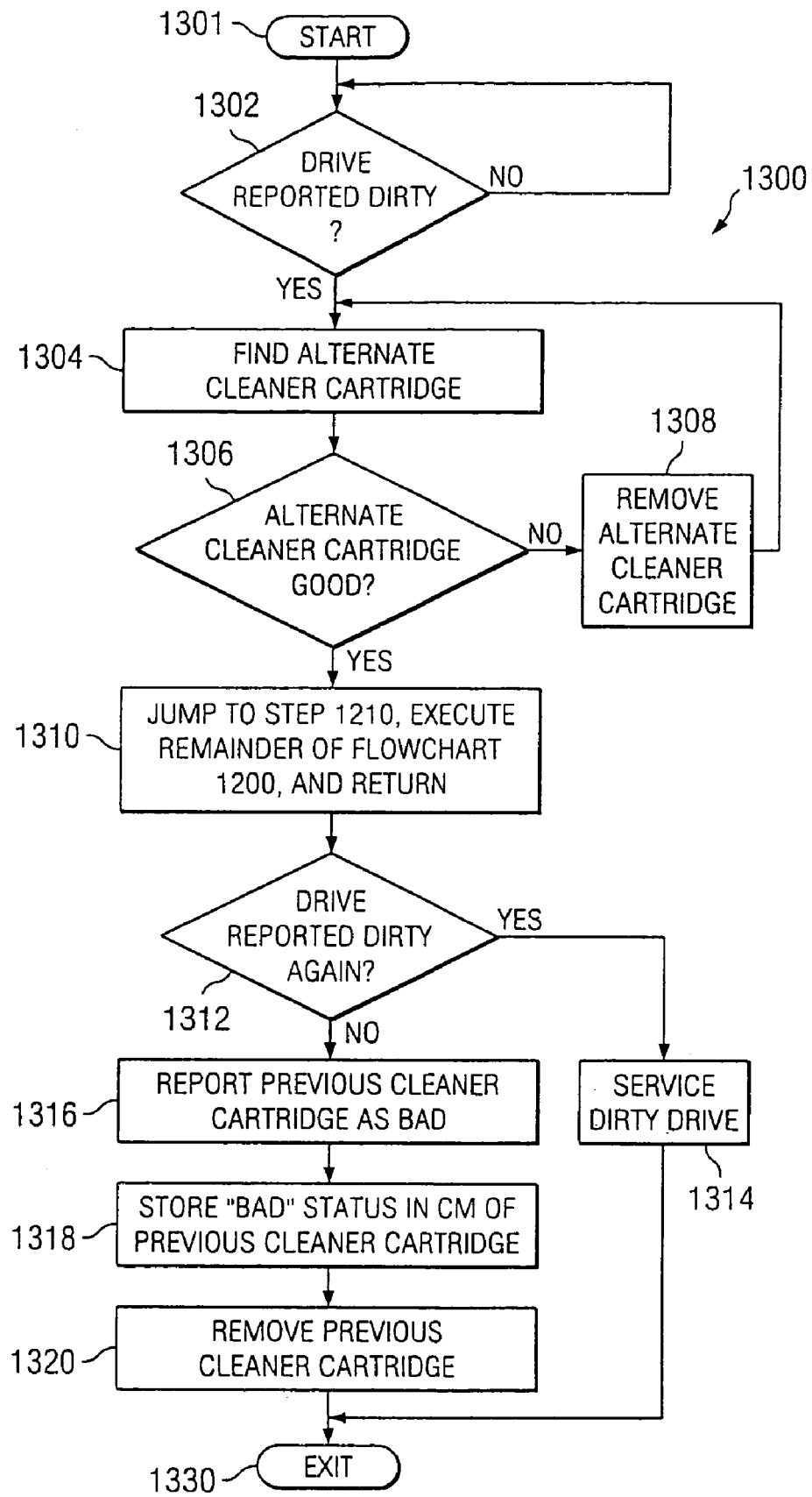
FIG. 13 is a flowchart illustrating additional cleaning of a dirty tape drive.

The flowchart of FIG. 13 begins at step 1301 and flows to decision step 1302, where the determination is made whether the report on drive 15 in step 1222 of FIG. 12 is that the drive was "DIRTY". If the decision is no in step 1302, the process cycles back to step 1301, where the process continues to search for tape drives 15 which cannot be cleaned by cleaner cartridge 700. If, the determination is "yes" in step 1302, the process flows to step 1304, where an alternated cleaner cartridge is located. Specifically, the cleaner cartridge which failed to clean tape drive 15 in flowchart 1200 is not reused. Once a cleaner cartridge is found, a determination is made in step 1306 as to whether the cleaner cartridge is a good cleaner cartridge. By accessing cartridge memory 703 in cleaner cartridge 700 via grid bus communications 704, the "GOOD/BAD" status of cleaner cartridge 700 can be ascertained. If indeed the found cleaner cartridge is "BAD", the process flows to step 1308 where the "BAD" cleaner cartridge is removed from further service by removing it from library module 11, and the process flows back to step 1304 where a search for another cleaner cartridge is made. If the found cleaner cartridge is indeed "GOOD", the process flows to step 1310 and process jumps to step 1210 of flowchart 1200 in order to repeat the cleaning process with the alternate cleaning cartridge.

Once tape drive 15 is cleaned with alternate cleaner cartridge 700, the process returns from flowchart 1200 and proceeds to decision step 1312, where the determination is made whether tape drive 15 is still dirty by interrogating the results in step 1222 of FIG. 12 for the use of alternate cleaning cartridge 700. If the determination is "yes" in step 1312, then service personnel are called in step 1314 to service tape drive 15, as use of two different cleaner tapes was unsatisfactory in cleaning I/O transducer 1100 and tape drive 15 needs to be repaired before the dirty I/O transducer results in the loss of customer data. If the determination is no in step 1312, the process flows to step 1316, where the tape drive is considered clean via the use of the alternated cleaner cartridge selected in step 1304 and the original cleaner cartridge selected in step 1204 is reported as a "BAD" cleaner cartridge. A cleaner cartridge can fail to clean tape drive 15 and be reclassified from "GOOD" to "BAD" for several reasons, such as the cleaning tape 801 is too old or cleaning tape 801 has already been used too many times and it has too much debris on it from previous cleaning attempts. The process flows to step 1318, where the status of "BAD" is recorded in cartridge memory 703 of cleaner cartridge 700 and, in step 1320, the "BAD" cleaner cartridge is removed from service. At the conclusion of steps 1314, 1318, and 1320, the process exits at step 1330.

Those skilled in the art of cleaning servo-head elements may develop other embodiments of the present invention. The terms and expressions which have been employed in the foregoing specification are used herein as terms of description and not of limitation, and there is no intention in the use of such terms and expressions of excluding equivalents of the features shown and described or portions thereof, it being recognized that the scope of the invention is defined and limited only by the claims which follow.

We claim:

1. A method for cleaning a tape drive having an input/output transducer, said input/output transducer having servo heads, comprising the steps of:
   detecting a degraded status of the input/output transducer;
   selecting and inserting a cleaner cartridge into the tape drive, said cleaner cartridge including a cleaner tape, wherein the cleaner tape includes first timing-based servo information;
   moving the cleaner tape over the input/output transducer;
   reading said first timing-based servo information from the cleaner tape; and
   ascertaining a first cleanliness status of the servo heads based on a reading of the first timing-based servo information read from the cleaner tape.

2. The method of cleaning a tape drive of claim 1, wherein the first timing-based servo information includes servo stripes.

3. The method of cleaning a tape drive of claim 1, wherein the first timing-based servo information includes alpha-numeric information.

4. The method of cleaning a tape drive of claim 3, wherein the alpha-numeric information includes linear position ("LPOS") information.

5. The method of cleaning a tape drive of claim 1, wherein the step of detecting a degraded status of the input/output transducer includes evaluating a servo frame rate error.

6. The method of cleaning a tape drive of claim 1, wherein the step of detecting a degraded status of the input/output transducer includes evaluating the amount of error correction performed by the tape drive.

7. The method of cleaning a tape drive of claim 1, wherein the step of detecting a degraded status of the input/output transducer includes evaluating the amount of error recovery performed by the tape drive.

8. The method of cleaning a tape drive of claim 1, wherein the step of detecting a degraded status of the input/output transducer includes the step of monitoring of read/write amplitude information.

9. The method of cleaning a tape drive of claim 8, wherein the monitoring of read/write amplitude information occurs within a calibration region.

10. The method of cleaning a tape drive of claim 9, wherein the calibration region includes magnetic data tape for self-characterization.

11. The method of cleaning a tape drive of claim 1, further comprising the step of recording the degraded status of the input/output transducer.

12. The method of cleaning a tape drive of claim 1, further comprising the steps of including a cartridge memory in the cleaner cartridge and recording the degraded status of the input/output transducer in the cartridge memory.

13. The method of cleaning a tape drive of claim 1, further comprising the steps of:
if the degraded status is DIRTY, selecting and inserting an alternate cleaner cartridge into the tape drive, wherein the alternate cleaner cartridge includes second timing-based servo information;
moving the alternate cleaner cartridge over said input/output transducer;
reading said second timing-based servo information from said alternate cleaner cartridge; and
ascertaining the first cleanliness status of the servo heads based on a reading of the second timing-based servo information.

14. The method of cleaning a tape drive of claim 1, wherein the cleaner cartridge includes an aggressive cleaning frontcoat section and an alternative frontcoat section.

15. The method of cleaning a tape drive of claim 14, wherein the cleaner tape includes a free end, the free end is located within the aggressive cleaning frontcoat section, and the aggressive cleaning frontcoat section is utilized as a leader tape.

16. The method of cleaning a tape drive of claim 14, wherein the cleaner tape includes a free end, the free end is located within the alternative frontcoat section, and the alternative frontcoat section is utilized as a leader tape.

17. The method of cleaning a tape drive of claim 14, wherein a first cleaning motion is utilized for applying the aggressive cleaning frontcoat section to the input/output transducer and a second cleaning motion is utilized for applying the alternative frontcoat section to the input/output transducer.

18. The method of cleaning a tape drive of claim 17, wherein the first cleaning motion is a streaming motion.

19. The method of cleaning a tape drive of claim 17, wherein the first cleaning motion is a backhitch motion.

20. The method of cleaning a tape drive of claim 14, wherein the aggressive cleaning frontcoat section includes particles chosen from the group of chromium dioxide, alumina, chrome-3, and silicon dioxide.

21. The method of cleaning a tape drive of claim 14, wherein the alternative frontcoat section includes standard data tape.

22. The method of cleaning a tape drive of claim 14, wherein the alternative frontcoat section includes metal particles for non-aggressive cleaning.

23. The method of cleaning a tape drive of claim 22, wherein the metal particles include magnetic ferrites.

24. The method of cleaning a tape drive of claim 23, wherein the magnetic ferrites includes barium ferrite.

25. The method of cleaning a tape drive of claim 14, wherein the alternative frontcoat section includes oxide-coated iron metal.

26. The method of cleaning a tape drive of claim 14, wherein the alternative frontcoat section includes magneto-optical tape.

27. The method of cleaning a tape drive of claim 14, wherein the alternative frontcoat section includes optical phase-change tape.

28. The method of cleaning a tape drive of claim 1, wherein the input/output transducer includes read elements and write elements, further comprising the steps of:
reading pre-written data from the cleaner tape;
ascertaining a second cleanliness status of the read elements of the drive head based on the reading pre-written data;
writing first new data to a portion of the cleaner tape;
reading second new data from said portion of the cleaner tape;
ascertaining a third cleanliness status of the write elements of the input/output transducer based on a correspondence of the second new data to the first new data.

* * * * *